(No Model.)

A. P. CHASE.
HORSE SHIELD.

No. 484,701. Patented Oct. 18, 1892.

Witnesses

Inventor
Amos P. Chase
By his Attorney

THE NORRIS PETERS CO., PHOTO-LITHO., WASHINGTON, D. C.

UNITED STATES PATENT OFFICE.

AMOS P. CHASE, OF BURGH HILL, OHIO.

HORSE-SHIELD.

SPECIFICATION forming part of Letters Patent No. 484,701, dated October 18, 1892.

Application filed April 5, 1892. Serial No. 427,906. (No model.)

*To all whom it may concern:*

Be it known that I, AMOS P. CHASE, of Burgh Hill, in the county of Trumbull and State of Ohio, have invented certain new and useful Improvements in Horse-Shields; and I do hereby declare the following to be a full, clear, and exact description of the invention, such as will enable others skilled in the art to which it appertains to make and use the same.

This invention relates to a new and improved horse or stallion shield, and has for its object the production of a cheap, simple, and highly-efficient device of this nature which will effectually serve the purpose for which intended without inflicting any injury or causing deleterious results to the animal.

The invention further comprises a horse-shield of peculiar construction and arrangement, substantially as hereinafter fully set forth, and particularly pointed out in the claim.

Figure 1:
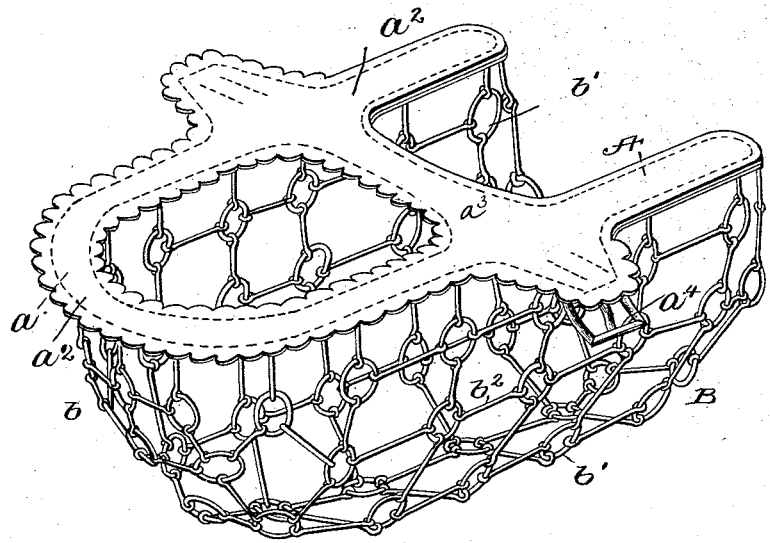
Figure 2:
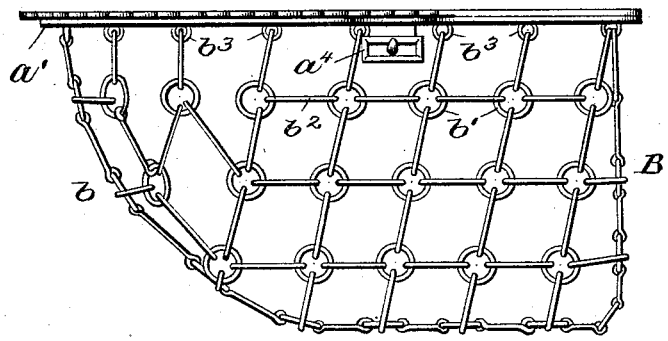

In the accompanying drawings, Figure 1 is a view in perspective. Fig. 2 is a side view thereof.

Referring to the drawings, A designates a frame of approximately U shape, having a forward curved end $a$ and a rear open end. This frame is provided on its under side with a covering $a'$ of leather and on its upper surface with a covering or padding $a^2$ of felt or the like, said coverings $a'$ and $a^2$ having corresponding connecting portions $a^3$, which serve to hold the sides of frame A together and also form additional contact or bearing against the horse's belly. The frame is held applied to a horse, as customary, by suitable straps engaging buckles $a^4$, extended from opposite sides of frame A, said buckles being attached to the coverings $a'$ and $a^2$.

B is a flexible pocket depending from the under side of frame A. This pocket is open at its rear end, and is provided with a forward closed end $b$. I have shown pocket B as being composed of metallic rings $b'$, and loosely connected links $b^2$, uniting said rings in squares. The links $b^2$ of the topmost row are secured to the sides and curved end of frame A by eyelets $b^3$, projecting from said frame. This pocket depends from frame A a suitable distance, and while effectually subserving the purpose for which intended without hurting the horse also permits him to lie down to rest without the slightest danger of injury. Another and important advantage is that the flexible pocket presents no sharp points or projections, thus avoiding a further liability of injury to the animal.

A horse-shield thus constructed is extremely simple and inexpensive, and providing a flexible open-work or screen-like pocket the cleanliness of the attachment or shield is maintained, and the pocket will assume its normal position when the horse is standing and readily collapse or fold when the animal is lying down.

I claim as my invention—

The herein-described improved horse-shield, comprising the frame and the flexible pocket depending therefrom for some distance and composed of a series of links loosely connected together, said pocket being closed at its forward end and open at its rear end, substantially as set forth.

In testimony whereof I have signed this specification in the presence of two subscribing witnesses.

AMOS P. CHASE.

Witnesses:
R. H. MILLIKIN,
A. M. MORAN.